United States Patent [19]

Nihei et al.

[11] Patent Number: 5,668,578

[45] Date of Patent: Sep. 16, 1997

[54] METHOD FOR FABRICATING FERROLELECTRIC DOMAIN REVERSALS, AND OPTICAL WAVELENGTH CONVERTER ELEMENT

[75] Inventors: Yasukazu Nihei; Akinori Harada, both of Kanagawa-ken, Japan

[73] Assignee: Fuji Photo Film Co., Ltd., Kanagawa, Japan

[21] Appl. No.: 271,978

[22] Filed: Jul. 8, 1994

[30] Foreign Application Priority Data

Jul. 9, 1993 [JP] Japan ................... 5-170071

[51] Int. Cl.$^6$ ................... G01D 9/00
[52] U.S. Cl. ............... 346/74.3; 346/74.4; 204/157.41; 204/164
[58] Field of Search ............. 346/74.4, 74.6, 346/74.3; 204/157.15, 157.41, 164

[56] References Cited

U.S. PATENT DOCUMENTS 5,395,495  3/1995  Nozaki ................ 204/157.44
5,415,743  5/1995  Harada ................ 204/130

FOREIGN PATENT DOCUMENTS 61-38506  5/1994  Japan ................... G02F 1/37

OTHER PUBLICATIONS

*Interactions Between Light Waves in a Nonlinear Dielectric*, Bleombergen et al., Physics Review, vol. 127, No. 6, pp. 1918–1939, (1962).

*Fabrication of Periodic Domain Grating in $LiNbO_3$ by Electron Beam Writing for Application of Nonlinear Optical Processes*, Ito et al., Electronics Letters, vol. 27, No. 14, pp. 1221–1222, (1991).

Primary Examiner—Mark J. Reinhart
Attorney, Agent, or Firm—Sughrue, Mion, Zinn, Macpeak & Seas

[57] ABSTRACT

A ferroelectric substance such as $LiNbO_3$ that possesses a unipolarized non-linear optical effect is etched on its surface. An earth electrode is formed on one surface (the +z plane) of a ferroelectric substance. Domain reversals are created on the opposite side (the −z plane) of the substrate relative to the +z plane by irradiating electron beams onto the −z plane.

4 Claims, 4 Drawing Sheets

METHOD FOR FABRICATING FERROLELECTRIC DOMAIN REVERSALS, AND OPTICAL WAVELENGTH CONVERTER ELEMENT

BACKGROUND OF THE INVENTION

1. Field Of the Invention

This invention relates to an optical wavelength converter element for converting a fundamental wave into a second harmonic wave, or the like, and, more particularly, to an optical wavelength converter element having periodic domain reversals.

Moreover, this invention relates to a method for creating domain reversals in a predetermined pattern on a ferroelectric substance having a non-linear optical effect in order to fabricate the foregoing optical wavelength converter element.

2. Description of the Prior Art

A proposal has already been made by Bleombergen et al. in Physics Review vol. 127, No. 6 in 1918 (1962), in which the wavelength of a fundamental wave is converted into a second harmonic wave using an optical wavelength converter element with regions (domains) where the spontaneous polarization of a ferroelectric substance possessing a nonlinear optical effect is periodically inverted.

In this method, the fundamental wave can be phase matched with the second harmonic wave by setting the period Λ of the domain reversals to be an integral multiple of a coherence length Λc which is given by $$\Lambda c = 2\pi/\{\beta(2\omega) - 2\beta(\omega)\} \quad (1)$$

where $\beta(2\omega)$ designates the propagation constant of the second harmonic wave, and $2\beta(\omega)$ represents the propagation constant of the fundamental wave. When wavelength conversion is effected using a bulk crystal made of a nonlinear optical material, a wavelength to be phase-matched is limited to a specific wavelength inherent to the crystal. However, in accordance with the above described method, phase matching can be efficiently carried out by selecting a period Λ which satisfies the condition (1) for an arbitrary wavelength.

One example of the known fabrication methods for such periodic domain reversals is the method proposed by H. Ito, C. Takyu, and H. Inaba in Electronics Letters, vol. 27, No. 14, pp. 1221 (1991), wherein the −z plane of LiTaO$_3$ or LiNbO$_3$ is directly exposed to electron beams at room temperature. In this example, electron beams are irradiated to a ferroelectric substance while an earth electrode is formed on the opposite side (the +z plane in the above example) thereof relative to its exposed side.

In an optical wavelength converter element fabricated by the above fabrication method, periodic domain reversals are created throughout the thickness of an LiNbO$_3$ substrate (e.g. around 0.5 mm in thickness). In other words, the periodic domain reversals are created to extend from the −z plane to the +z plane of the substrate. For this reason, this type of element can be applied a bulk type optical wavelength converter element. In a wavelength converter element in which third-order periodic domain reversals are created in accordance with the previous method, phase matching is observed in the bulk by the wavelength sweep of a Ti:Al$_2$O$_3$ laser.

Also, as described in Japanese Unexamined Patent Publication No. 6(1994)-138506, it is possible to create periodic domain reversals by irradiating ion beams, which are an example of high energy beams, the same as electron beams, onto a ferroelectric substance instead of irradiating the electron beams.

However, in the existing method for creating domain reversals by the irradiation of high energy beams such as electron beams and ion beams, it is widely known that the geometry of the domain reversals is inferior in evenness and reproducibility. Moreover, in this existing method, it is difficult for the domain reversals to be formed in an ideal linear pattern. Hence, it is also known that the domain reversals become uneven in thickness or dot-shaped in most cases.

SUMMARY OF THE INVENTION

In view of the foregoing observations, the primary object of the present invention is to provide a method for creating ferroelectric domain reversals in which domain reversals in an ideal linear pattern on periodic pitches can be created with superior reproducibility.

Another object of the present invention is to provide an optical wavelength converter element having ideal linear periodic domain reversals.

To these ends, according to one aspect of the present invention, there is provided a method for creating ferroelectric domain reversals having the steps of:

forming an earth electrode on one surface of a unipolarized ferroelectric substance which has a non-linear optical effect; and irradiating high energy beams onto the ferroelectric substance from the front surface thereof that is opposite to the one surface to create domain reversals; further comprising the step of:

etching at least one surface of the ferroelectric substance before the earth electrode is formed on the surface of the ferroelectric substance.

As a further feature, the high energy beams are electron beams.

According to another aspect of the present invention, there is provided an optical wavelength converter element in which periodic domain reversals are created on a ferroelectric substance in accordance with the above method.

When the ferroelectric substance has been previously subjected to an etching treatment, the domain reversals become an ideal linear pattern. Therefore, evenness of the domain reversals through the thickness of the ferroelectric material is considerably improved, and the reproducibility of the geometry of the domain reversals is improved approximately up to 100%. It is considered that this is attributable to the improved adhesiveness between the etched surface of the ferroelectric substance and the earth electrode.

As mentioned above, if domain reversals whose pitch is accurately controlled in an ideal pattern are created in a ferroelectric substance, a non-linear optical constant of this ferroelectric substance will be improved. Hence, when this ferroelectric substance is used as an optical wavelength converter element, a wavelength conversion efficiency is considerably improved.

In addition, when the domain reversals are formed in an ideal linear pattern, a threshold value of an optical intensity that causes optical damage on the ferroelectric substance is raised, and hence optical damage resistive characteristics of the optical wavelength converter element are also improved.

DETAILED DESCRIPTION OF THE PREFERRED EMBODIMENTS

With reference to the accompanying drawings, preferred embodiments of the present invention will now be described.

Figure 1A:
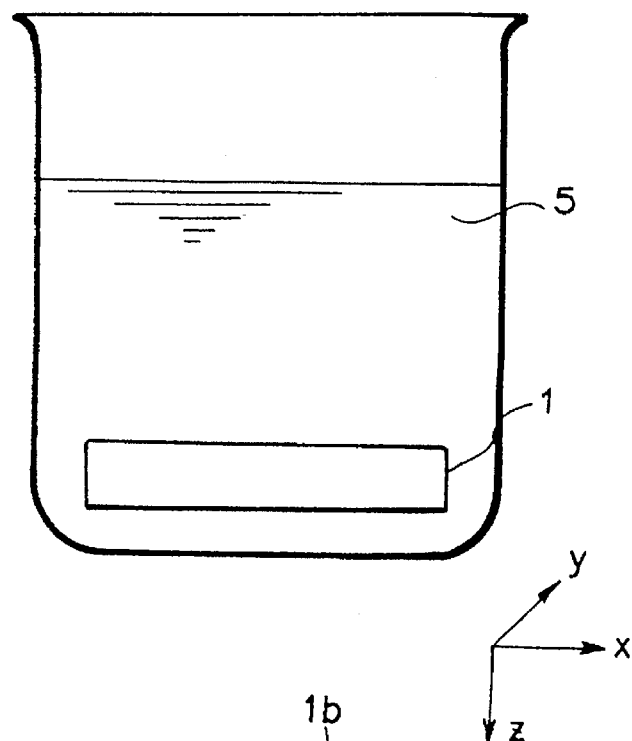
FIGS. 1a–1c are explanatory diagrams for illustrating a method for creating domain reversals according to one embodiment of the present invention.
Figure 1B:
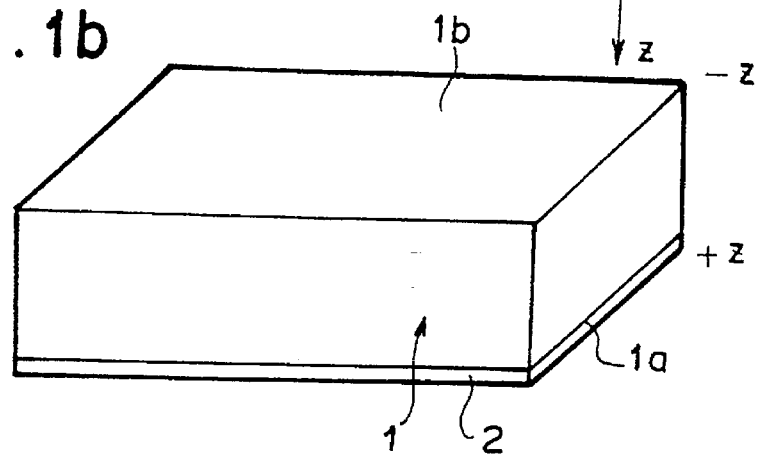
Figure 1C:
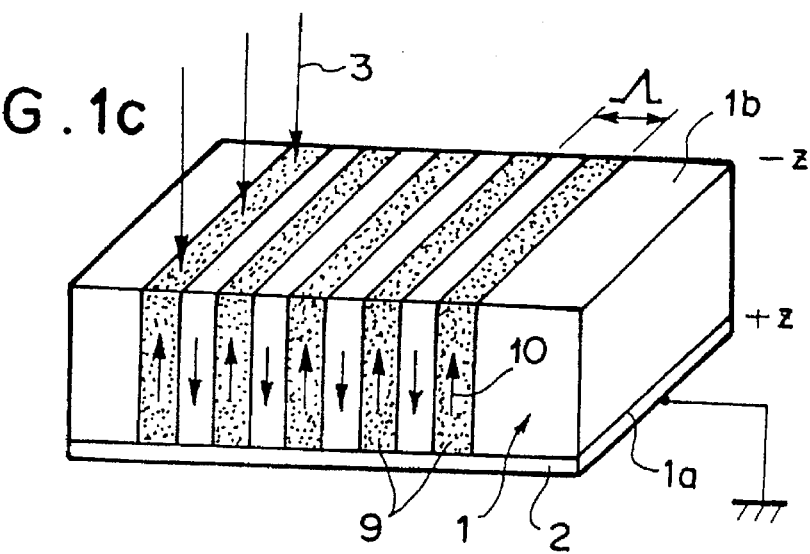

FIGS. 1a–1c illustrate processes of the fabrication of domain reversals according to one embodiment of the present invention. In these figures reference numeral 1 designates an LiNbO₃ substrate which acts as a ferroelectric substance possessing a nonlinear optical effect. This substrate 1 is subjected to a unipolarization treatment, and is formed to a thickness of 0.5 mm. In this substrate, a "z" plane which is optically polished along its "z" planes is used so that the largest nonlinear optical material constant $d_{33}$ can be effectively utilized.

As shown in FIG. 1a, this substrate 1 is immersed for three minutes in a hydrofluoric-nitric acid liquid 5 that is a liquid mixture consisting of a hydrofluoric acid (HF) and a nitric acid (HNO₃) in the ratio 1:2. This treatment causes the entire surface of the substrate 1 to be lightly etched.

After the substrate 1 has been taken out of the hydrofluoric-nitric acid liquid 5 and then dried, a Cr thin film 2 is deposited to a thickness of 30 nm on the +z plane of this substrate 1 as an earth electrode as shown in FIG. 1b.

As can be seen from FIG. 1c, electron beams 3 emanated from a known non-illustrated electron beam radiation unit are irradiated onto localized areas on the −z plane of the substrate 1 from the side labelled for example an electron beam accelerating voltage is set to 20 kV, and an irradiation current is set to 0.3 nA. The radiation of the electron beams causes domain reversals 9 to be periodically defined on given pitches Λ deeply enough to reach the surface 1a of the substrate 1. An arrow 10 in FIG. 1c designates the direction of polarization of the ferroelectric substance. The period Λ is set to 4.6 µm, allowing for the wavelength dispersion of the diffractive index of LiNbO₃, so that a first-order period can be defined around 946 nm along the x-axis of the substrate 1.

Figure 2:
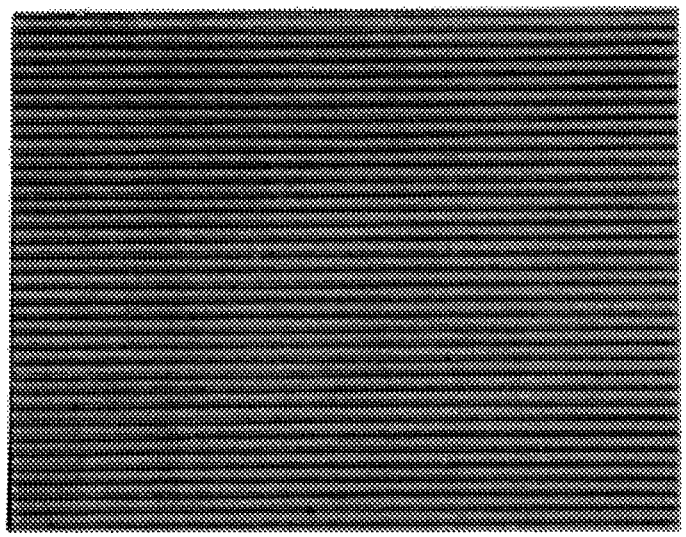
FIG. 2 is a microphotograph of a pattern of domain reversals created on a LiNbO₃ substrate according to a method of the present invention.

The Cr thin film 2 on the +z plane 1a is etched away, and the geometry of the domain reversals 9 in the +z plane 1a is observed by a microscope. FIG. 2 shows a photograph of an image seen in the microscope. As illustrated in this drawing, the domain reversals 9 (dark linear portions in the photograph) have formed an ideal linear pattern in which an even pitch of Λ=4.6 µm is maintained. It was ascertained that the evenness of the geometry within the z planes of the domain reversals were notably superior.

More than one hundred samples of the substrate 1 were subjected to a treatment for creating domain reversals as mentioned above. In any one of the samples, the geometry of the domain reversals 9 within the +z plane 1a was the same as that described above, and it was ascertained that the reproducibility of the geometry of the domain reversals was almost 100%.

Figure 3:
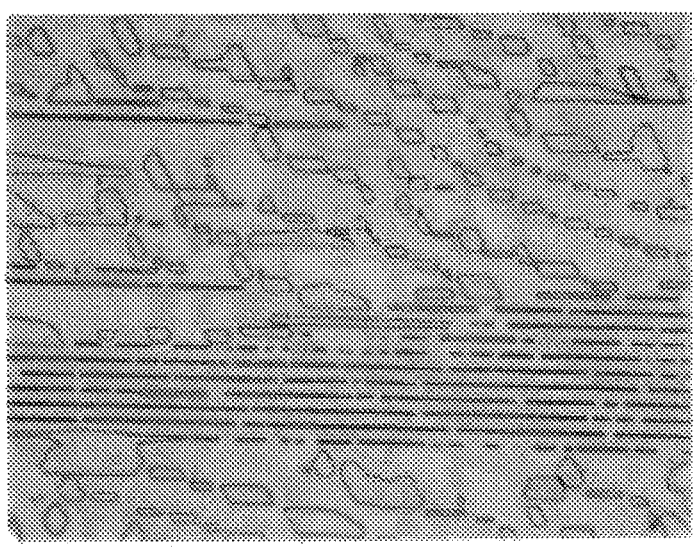
FIG. 3 a microphotograph of a pattern of domain reversals created on a LiNbO₃ substrate according to a conventional method.

Contrary to this, as a comparative example, the domain reversals 9 are created on the LiNbO₃ substrate 1 in the same manner as in the previous embodiment, except that the substrate is not subjected to an etching treatment using the hydrofluoric-nitric acid liquid 5. FIG. 3 is a microphotograph of the resulting geometry of the domain reversals 9 in the +z plane 1a in this instance. As can be seen from this figure there are only a few domain reversals 9 (dark linear portions in the photograph) which are completely linear and in which given pitches are maintained. Most of the domain reversals 9 are linear but uneven in thickness or dot-shaped.

An optical wavelength converter element made of the substrate 1 in which the periodic domain reversals are created in the previous embodiments will now be explained.

Figure 4:
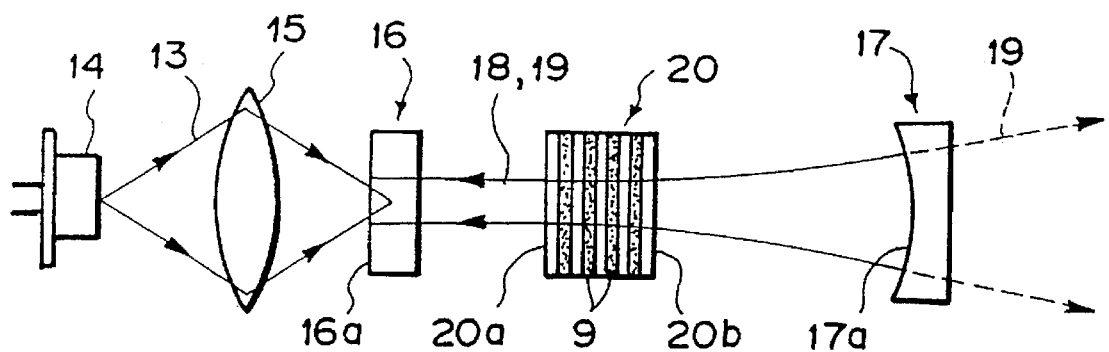
FIG. 4 a schematic representation showing the structure of a solid-state laser equipped with an optical wavelength converter element in which domain reversals are created according to the method of the present invention.

The x and −x planes of the substrate 1 are respectively polished, so that they become light transmission planes 20a and 20b. As shown in FIG. 4, there is obtained a bulk crystal type optical wavelength converter element 20. The bulk crystal type optical wavelength converter element 20 that has the periodic domain reversals is disposed within a resonator of a laser-diode-pumped YAG laser shown in FIG. 4.

This laser-diode-pumped YAG laser is made up of: a laser diode 14 that emanates a laser beam 13 as a pumping beam at a wavelength of 809 nm; a condenser lens 15 that converges the laser beam 13 which is in a diverged state; a YAG crystal 16 that is a laser medium doped with Nd (Neodymium) and disposed at a position at which the laser beam 13 is converged; and a resonator mirror 17 that is disposed in front of this YAG crystal 16 (on the right side in the drawing). The crystal length of the optical wavelength converter element 20 is set to 1 mm, and this optical wavelength converter element 20 is interposed between the resonator mirror 17 and the YAG crystal 16.

The YAG crystal 16 is excited by the laser beam 13 at a wavelength of 809 nm, and emanates a laser beam 18 at a wavelength of 946 nm. This solid-state laser beam 18 resonates between an end face 16a of the YAG crystal which is covered with a predetermined coating and a mirror plane 17a of the resonator mirror 17. The resulting solid-state laser beam 18 is then incident on the optical wavelength converter element 20, and is converted into a second harmonic wave 19 having a half wavelength, i.e., at a wavelength of 473 nm. The solid-state laser beam 18 that acts as a fundamental wave and the second harmonic wave 19 are phase-matched (so-called pseudo phase matching) in the periodic domain reversals, and only the second harmonic wave 19 substantially passes through the mirror plane 17a.

In this embodiment, there was obtained the second harmonic wave 19 having an output power of 10 mW when an output power of the laser diode 14 was 200 mW. This second harmonic wave 19 has a clear profile that is free of scattered light and stray light. Meanwhile, when an optical wavelength converter element is fabricated in the same manner as the optical wavelength converter element 20, except that it is not subjected to an etching treatment using the above-mentioned hydrofluoric-nitric acid 5. When the optical wavelength converter element thus fabricated is disposed in the resonator of the laser-diode-pumped YAG laser, the output power of the second harmonic wave was 1 mW when the output power of the laser diode 14 was 200 mW, the same laser power output used above. In this respect, it is understandable that the domain reversals 9 created by the method of the present invention are maintained on even pitches Λ and become an ideal linear pattern.

As already mentioned above, the effects of the present invention maybe explained by an improved adhesiveness between the surface of the ferroelectric substance subjected to an etching treatment and the earth electrode.

Results of the confirmation of this point will now be described. The $LiNbO_3$ substrate 1, having its +z plane 1 lightly etched in the same manner as in the previous embodiment, and the $LiNbO_3$ substrate 1, having its −z plane 1b lightly etched, are prepared. The Cr thin film 2 is created as an earth electrode on the +z plane 1a of each substrate 1. In the same manner as in the previous embodiment, the domain reversals 9 are created by the irradiation of electron beams.

Figure 6:
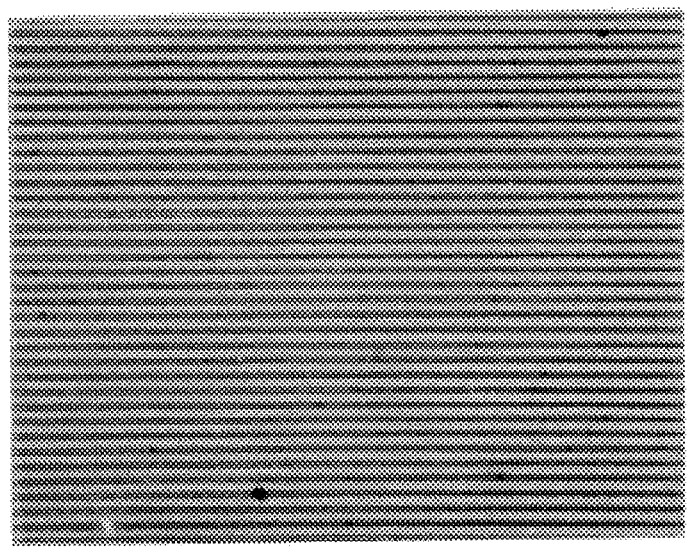
FIG. 6 is a microphotograph of a pattern of domain reversals created on a LiNbO₃ substrate according to another method of the present invention.
Figure 7:
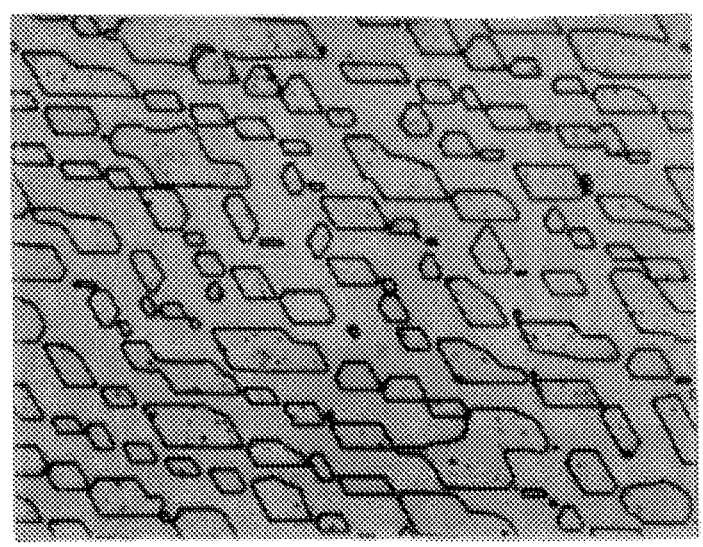
FIG. 7 is a microphotograph of a pattern of domain reversals created on a LiNbO₃ substrate according to a comparative example method with respect to the present invention.

FIG. 6 is a microphotograph which shows the resulting geometry of the domain reversals 9 in the +z surface 1a of the former substrate 1, whereas FIG. 7 is a microphotograph which shows the resulting geometry of the domain reversals in the +z surface 1a of the latter substrate 1. As shown in FIG. 6, the domain reversals 9 (dark linear portions in the photograph) of the former substrate 1 appear linear and evenly pitched. Also, the evenness of the geometry of the domain reversals is extremely superior. On the other hand, as shown in FIG. 7, in the latter substrate 1 which serves as a comparative example, there are few complete linear domain reversals 9 (dark linear portions in the photograph) in which pitches are maintained, and most of the domain reversals 9 are linear but uneven in thickness or dot-shaped.

Although the $LiNbO_3$ substrate 1 is etched by the hydrofluoric-nitric acid liquid 5 in the above embodiment, an etching treatment is not limited to such a treatment. For example, it is possible for the substrate to be etched by a 10% water solution of NaOH under at room temperature.

Figure 5:
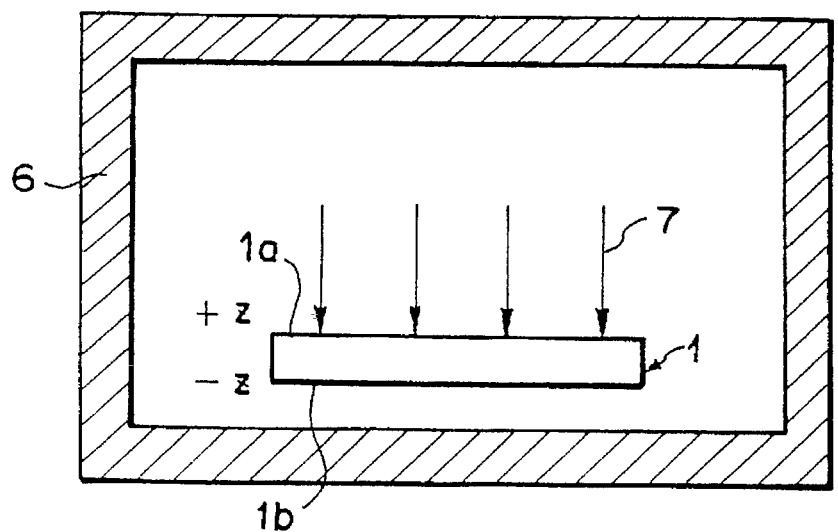
FIG. 5 is a schematic representation illustrating another example of an etching treatment according to the present invention.

Moreover, dry etching without the use of the foregoing etchant can be also applied to the present invention. FIG. 5 schematically shows one example of a dry etching treatment. As shown in the drawing, the $LiNbO_3$ substrate 1 is positioned inside a vacuum chamber 6, and a fluorocarbon gas ($CF_4$) 7 which is changed to a plasma state by a non-illustrated high frequency plasma generator is sprayed onto the +z surface 1a on which an earth electrode such as the Cr thin film 2 will be created later. Thereby, the +z surface 1a of the substrate 1 is lightly etched. After the completion of this etching treatment, it only needs the creation of domain reversals in the same manner as in the previous embodiment. High frequency power of the high frequency plasma generator is set to, for example, 70 W, and a degree of vacuum within the vacuum chamber 6 is set to, for example, $5 \times 10^{-2}$ Torr or thereabouts.

The application of the present invention is not limited to the case where electron beams are irradiated onto a ferroelectric substance as mentioned in the previous embodiments, but the present invention may be applied to the case where domain reversals are created by likewise irradiating other ion beams as high energy beams onto a ferroelectric substance.

The method for creating domain reversals according to the present invention is not limited to $LiNbO_3$ but may be applied to the case where domain reversals are created in other ferroelectric substances having a non-linear optical effect, for example, $LiTabO_3$ and $MgO-LiNbO_3$ or the like.

It will be understood that the above description of the present invention is susceptible to various modifications, changes, and adaptations and that the same are intended to be comprehended within the meaning and range of equivalents of the appended claims.

What is claimed is:

1. A method for creating ferroelectric domain reversals in a unipolarized ferroelectric substance with a non-linear optical effect comprising the steps of:

etching at least one surface of the ferroelectric substance;

forming an earth electrode on a first surface of the etched ferroelectric substance; and irradiating high energy beams onto the ferroelectric substance, on a second surface thereof that is opposite to the first surface, to create domain reversals.

2. A method for creating ferroelectric domain reversals as defined in claim 1, wherein the high energy beams are electron beams.

3. A method for creating ferroelectric domain reversals as defined in claim 1, wherein said etching step comprises immersing the ferroelectric substance in a liquid etchant.

4. An optical wavelength converter element in which periodic domain reversals are created on a ferroelectric substance according to the method for creating ferroelectric domain reversals as defined in claim 1, claim 2 or claim 3.

* * * * *